June 24, 1930.  H. E. MARSHALL  1,767,149
OVERSHOT
Filed Aug. 27, 1928
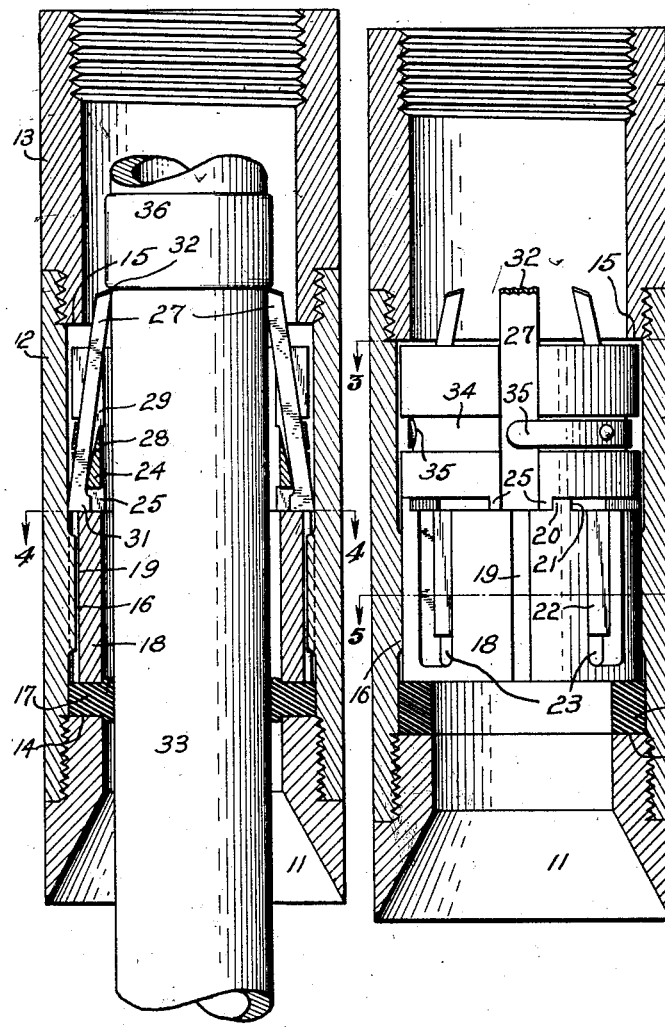
Fig. 1
Fig. 2
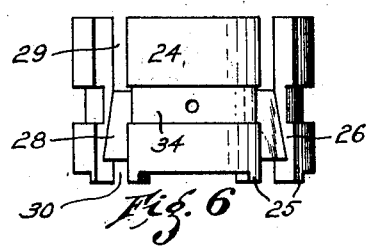
Fig. 6
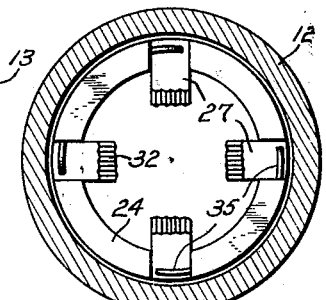
Fig. 3
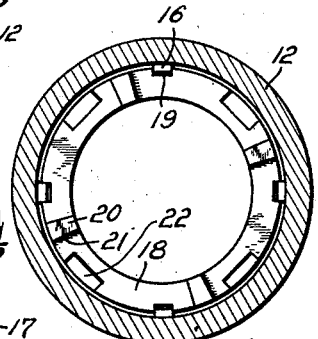
Fig. 4
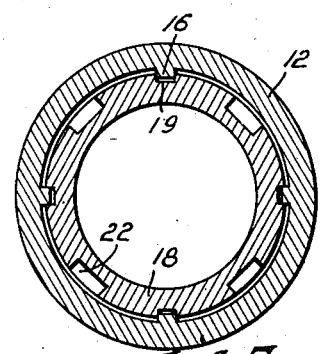
Fig. 5
INVENTOR;
Horace E. Marshall,
by Arthur J. Farnsworth
ATTORNEY Patented June 24, 1930

1,767,149

UNITED STATES PATENT OFFICE

HORACE E. MARSHALL, OF LOS ANGELES, CALIFORNIA

OVERSHOT

Application filed August 27, 1928. Serial No. 302,206.

My invention relates to overshots for deep-well fishing operations. Its principal objects include; first, to provide an improved type of overshot that embodies means for packing-off the fish, in such a manner that circulation may be maintained through it; second, to furnish facilities for releasing the grip upon the fish, so that the device may be withdrawn in case the fish can not be pulled; third, to supply a device of this nature that can not be rendered inoperative by accumulations of mud around the working parts, such parts being adapted to positively free themselves from such accumulations; and, fourth, to accomplish the above purposes by means of a simple and relatively inexpensive construction of great strength.

My objects are attained in the manner illustrated in the accompanying drawings, in which—

Figure 1 illustrates the complete invention by itself, the housing and packing-off ring being shown in central longitudinal section and the other parts in elevation;

Figure 2 is a central longitudinal section of the tool, after it has engaged a fish and then has been pulled upwardly a short distance for "packing-off" the circulation;

Figure 3 is a cross-section of the tool taken on the line 3—3 of Fig. 1, showing a plan view of the gripping-dogs and their floating cage;

Figure 4 is a cross-section of the tool taken on the line 4—4 of Fig. 2, showing a plan view of the longitudinally slidable cylinder employed for compressing the packing-off ring, and for releasing the gripping-dogs and stowing them in inoperative position;

Figure 5 is a cross-section of the tool taken on the line 5—5 of Fig. 1, showing a cross-section of the slidable cylinder; and Figure 6 is an elevation of the floating dog-cage by itself.

Similar reference numerals refer to similar parts throughout the several views.

In deep-well fishing operations, it is very desirable to be able to maintain a circulation through the fish after it has been engaged, since it is much easier to withdraw it when this is done. It also is of great importance to be able to release the grip upon the fish, so that the fishing string can be withdrawn without breaking any of the parts in case it proves to be impossible to move the fish.

My invention comprises a bottom bell 11, screwed into the lower end of a short tubular housing-section 12. An upper tubular member 13 is screwed into the upper end of the housing section. The inner diameters of bell 11 and member 13 are materially less than the inner diameter of the housing, and afford annular shoulders 14 and 15 respectively for retaining the working parts within the housing. The inner wall of the housing, near the lower end of the chamber that contains the working parts, is provided with inwardly extending longitudinal fins 16.

Within the workng chamber is a relatively thick rubber ring 17, resting upon shoulder 14. Above this rubber ring, and resting thereon, is a longitudinally slidable cylinder 18 provided with longitudinal peripheral grooves 19 that engage fins 16, thus keeping the cylinder from turning with respect to the housing. The upper end of the cylinder is castellated, there being shown four upwardly extending lugs 20. The tool illustrated is adapted for normal clock-wise rotation looking downwardly, and, adjacent the rear faces 21 of lugs 20, are deep and wide rectangular peripheral slots 22, extending longitudinally downwardly to near the bottom of the cylinder. At the bottoms of the slots, openings 23 establish communication with the interior of the cylinder.

The dog-cage 24 is a cylinder having four pairs of lugs 25 extending downwardly from its bottom rim. These are adapted for being engaged by the cooperating faces of lugs 20 of the longitudinally slidable cylinder 18, upon which the dog-cage rests. Between the two lugs of each of the pairs 25, are deep longitudinal grooves 26 for containing the gripping-dogs 27. The bottoms 28 of these grooves are inclined inwardly and upwardly, and intersect the inner wall of the dog-cage a considerable distance from the top to form the slots 29. Slots 30 are formed at the bottoms of the dog-grooves to provide space for the L-shaped feet 31 of the dogs. The upper ends 32 of the dogs are shown serrated, and they may be hardened to adapt them to bite into a fish 33, to grip it for pulling. The usual practice, however, is to allow the clutch-dogs 27 to slip over a collar 36 of the fish, and to engage its lower rim as shown in Fig. 2. The dog-cage has a circumferential slot 34 to provide space for finger-springs 35, of which there are two. Each of the springs presses upon a dog at each end, to retain the latter in operative position.

In operation my device is lowered into a a well at the bottom of a fishing string, the working parts being in the positions shown in Fig. 1 and the fishing string being rotated slowly in a clock-wise direction looking downwardly. The slowly rotating bell end 11 finds the fish 33, and centers it with respect to the tool. A further lowering of the fishing string causes the tool to surround the fish and allow it to extend upwardly within it, beyond the four gripping dogs 27 whose upper ends are moved outwardly thereby, as shown in Fig. 2. Rotation of the fishing string is then stopped, and an upward pull is exerted thereon to cause the gripping-dogs to engage the fish in the manner described. If the fish is loose it can then be withdrawn by pulling up the fishing string.

In case the fish is fast in the hole, so that it cannot be pulled in the manner just described, an upward pull is exerted upon the fishing string, sufficient to squeeze the rubber ring 17 inwardly and tightly against the fish, as shown in Fig. 2. This will have the effect of packing-off the circulation from the outside of the fish, and cause the full circulating pressure to be applied to its interior. A continued upward pull, that is coincident with the maintenance of a circulating pressure within the fish, will usually loosen the latter so that it may be withdrawn.

In the worst situation that can happen, when the fish is absolutely unmovable by ordinary means, the grip of the tool can be released so that it can be withdrawn from the well without breakage. This is accomplished by turning the fishing string in a counter clock-wise direction until lugs 25 contact with the rear faces of lugs 20. The dogs 27 are then directly above slots 22, and an upward pull on the fishing string will cause the dogs to enter these slots and assume a vertical position. The grip of the dogs upon the fish is released in this manner, and the fishing string can then be withdrawn. If the slots should have been filled with mud or débris, the lower ends of the dogs will push this material out of the slots through openings 23.

From the above description it will be seen that I have provided a packing-off overshot of great strength and positive grip, which may be released for withdrawing without breakage, if this should prove to be necessary. It is quite possible that rubber ring 17 may be injured or destroyed in operation, but there is no need of having this happen until after it has served its purpose as a means for packing-off. The expense of replacing this ring when required is relatively insignificant.

Having thus fully described my invention, I claim:

1. A device of the character described, comprising; a tubular housing; a compressible annular packing ring within the housing; and longitudinally slidable means within the housing for gripping a fish, and for thereafter compressing said ring inwardly against the fish, by exerting an upward pull upon the housing; said gripping means being releasable, and capable of being made inoperative, by partially rotating the housing.

2. A device of the character described, comprising; a tubular housing having an interior annular shoulder near its lower end; a compressible annular packing ring within the housing, supported by said shoulder; and longitudinally slidable means, supported by said ring within the housing, whereby a fish may be gripped and thereafter said ring be compressed inwardly against the fish, by exerting an upward pull upon the housing; said gripping means being releasable, and capable of being made inoperative, by partially rotating the housing.

3. A device of the character described, comprising; a tubular housing; a removable bell-end affixed within the lower end of the housing and forming an annular shoulder within the housing; a compressible annular packing ring within the housing resting upon said shoulder; and longitudinally slidable means within the housing, above said ring and supported by it, whereby a fish may be gripped and thereafter said ring be compressed inwardly against the fish, by exerting an upward pull upon the housing; said gripping means being releasable, and capable of being made inoperative, by partially rotating the housing.

4. A device of the character described, comprising; a tubular housing having an annular supporting rim within it; a tubular clutch within the housing, supported by said rim, and adapted to engage a fish within it for pulling; and means for releasing the clutch engagement, and making the clutch inoperative, by partially rotating the housing while an upward pull is being exerted thereupon.

5. A device of the character described, comprising; a tubular housing having within it a non-rotatable cylindrical shell formed with longitudinal peripheral grooves extending downwardly from its upper end; and an angularly movable tubular clutch within the housing, supported by said end, and having dogs adapted to engage a fish within it for pulling; said dogs being normally supported by said end and adapted for dropping into said grooves, and thereby having their grip upon the fish released, when the housing is partially rotated while an upward pull is being exerted thereupon.

6. A device of the character described, comprising; a tubular housing having within it a non-rotatable cylindrical shell formed with longitudinal peripheral grooves extending downwardly from its upper end; and an angularly movable tubular clutch within the housing, supported by said end and having dogs adapted to engage a fish within it for pulling; said dogs being normally supported by said end and spring-constrained inwardly, and adapted for being forced downwardly into said grooves, and thereby have their gripping ends moved outwardly to release their engagement with the fish, when the housing is partially rotated while an upward pull is being exerted thereupon.

7. A device of the character described, comprising; a tubular housing; a compressible annular packing ring within the housing; longitudinally slidable means within the housing for gripping a fish, and for thereafter compressing said ring inwardly against the fish when an upward pull is exerted upon the housing; and means for releasing the grip upon the fish, and for preventing its being re-gripped by partially rotating the housing.

8. A device of the character described, comprising; a tubular housing having an interior annular shoulder near its lower end; a compressible annular packing ring within the housing, supported by said shoulder; an angularly positioned longitudinally slidable sleeve supported by said ring within the housing; and an angularly movable and longitudinally slidable tubular clutch within the housing supported by the upper rim of said sleeve; said clutch being adapted to engage a fish within it for pulling; and the sleeve and clutch being adapted to cooperate to release the engagement with the fish, when the housing is partially rotated while an upward pull is being exerted thereupon.

9. A device of the character described, comprising; a tubular housing having an interior annular shoulder near its lower end; a compressible annular packing ring within the housing, supported by said shoulder; an angularly positioned longitudinally slidable sleeve having grooves extending downwardly from its upper rim, supported by said ring within the housing; and an angularly movable and longitudinally slidable tubular clutch within the housing, supported by said upper rim; said clutch having dogs adapted to engage a fish within it for pulling; and said dogs being adapted for being forced downwardly into said grooves to release their grip upon the fish, when the housing is partially rotated while an upward pull is being exerted thereupon; said ring being adapted for being compressed by said sleeve inwardly against the fish when the latter has been engaged by the clutch and an upward pull is exerted upon the housing.

HORACE E. MARSHALL.